United States Patent
Khare (12)

(10) Patent No.: US 6,271,173 B1
(45) Date of Patent: Aug. 7, 2001

(54) PROCESS FOR PRODUCING A DESULFURIZATION SORBENT

(75) Inventor: Gyanesh P. Khare, Bartlesville, OK (US)

(73) Assignee: Phillips Petroleum Company, Bartlesville, OH (US)

( * ) Notice: Subject to any disclaimer, the term of this patent is extended or adjusted under 35 U.S.C. 154(b) by 0 days.

(21) Appl. No.: 09/431,454

(22) Filed: Nov. 1, 1999

(51) Int. Cl.[7] .................................................. B01J 20/30
(52) U.S. Cl. ......................... 502/406; 502/407; 502/415; 502/400
(58) Field of Search .............................. 502/406, 407, 502/415, 400, 337, 325, 345, 347, 324, 321, 305, 354, 352

(56) References Cited

U.S. PATENT DOCUMENTS

| | | | |
|---|---|---|---|
| 4,044,114 | 8/1977 | Dezael et al. | 423/574 R |
| 4,088,736 | 5/1978 | Courty et al. | 423/230 |
| 5,439,867 | * | 8/1995 | Khare et al. . |
| 5,703,003 | * | 12/1997 | Siriwardane . |
| 5,726,117 | * | 3/1998 | Khare et al. . |
| 5,914,292 | | 6/1999 | Khare et al. ................ 502/406 |
| 5,928,980 | * | 7/1999 | Gangwal et al. . |
| 5,935,420 | | 8/1999 | Baird, Jr. et al. ............. 208/213 |
| 5,985,169 | * | 11/1999 | Miller et al. . |

* cited by examiner

*Primary Examiner*—Steven P. Griffin
*Assistant Examiner*—Christina Ildebrando
(74) *Attorney, Agent, or Firm*—Jack E. Phillips

(57) ABSTRACT

Particulate sorbent compositions which are suitable for the removal of sulfur from streams of cracked-gasoline or diesel fuel are provided which have increased porosity, improved resistance to deactivation through the addition of a calcium compound selected from the group consisting of calcium sulfate, calcium silicate, calcium phosphate or calcium aluminate to the support system comprised of zinc oxide, silica and alumina having thereon a promotor wherein the promotor is metal, metal oxide or metal oxide precursor with the metal being selected from the group consisting of cobalt, nickel, iron, manganese, copper, molybdenum, tungsten, silver, tin and vanadium or mixtures thereof and wherein the valence of such promotor has been substantially reduced to 2 or less. Process for the preparation such sorbent systems as well as the use of same for the desulfurization of cracked-gasolines and diesel fuels are also provided.

11 Claims, No Drawings

PROCESS FOR PRODUCING A DESULFURIZATION SORBENT

FIELD OF THE INVENTION

This invention relates to the removal of sulfur from fluid streams of cracked-gasolines and diesel fuels. In another aspect this invention relates to sorbent compositions suitable for use in the desulfurization of fluid streams of cracked-gasolines and diesel fuel. A further aspect of this invention relates to a process for the production of sulfur sorbents for use in the removal of sulfur bodies from fluid streams of cracked gasolines and diesel fuels.

BACKGROUND OF THE INVENTION

The need for cleaner burning fuels has resulted in a continuing world wide effort to reduce sulfur levels in gasoline and diesel fuels. The reducing of gasoline and diesel sulfur is considered to be a means for improving air quality because of the negative impact the fuel sulfur has on the performance of automotive catalytic converters. The presence of oxides of sulfur in automotive engine exhaust inhibits and may irreversibly poison noble metal catalysts in the converter. Emissions from an inefficient or poisoned converter contain levels of non-combusted, non-methane hydrocarbon and oxides of nitrogen and carbon monoxide. Such emissions are catalyzed by sunlight to form ground level ozone, more commonly referred to as smog.

Most of the sulfur in gasoline comes from the thermally processed gasolines. Thermally processed gasolines such as, for example, thermally cracked gasoline, visbreaker gasoline, coker gasoline and catalytically cracked gasoline (hereinafter collectively called "cracked-gasoline") contains in part olefins, aromatics, and sulfur-containing compounds.

Since most gasolines, such as for example automobile gasolines, racing gasolines, aviation gasoline and boat gasolines contain a blend of at least in part cracked-gasoline, reduction of sulfuir in cracked-gasoline will inherently serve to reduce the sulfur levels in such gasolines.

The public discussion about gasoline sulfur has not centered on whether or not sulfur levels should be reduced. A consensus has emerged that lower sulfur gasoline reduces automotive emissions and improves air quality. Thus the real debate has focused on the required level of reduction, the geographical areas in need of lower sulfur gasoline and the time frame for implementation.

As the concern over the impact of automotive air pollution continues, it is clear that further efforts to reduce the sulfur levels in automotive fuels will be required. While the current gasoline products contain about 330 part per million with continued efforts by the Environmental Protection Agency to secure reduced levels, it has been estimated that gasoline will have to have less than 50 part per million of sulfur by the year 2010. (See Rock, K. L., Putman H. M., Improvements in FCC Gasoline Desulfurization via Catalytic Distillation" presented at the 1998 National Petroleum Refiners Association Annual Meeting (AM-98-37)).

In view of the ever increasing need to be able to produce a low sulfur content automotive fuel, a variety of processes have been proposed for achieving industry compliance with the Federal mandates.

One such process which has been proposed for the removal of sulfur from gasoline is called hydrodesulfurization. While hydrodesulfurization of gasoline can remove sulfur-containing compounds, it can result in the saturation of most, if not all, of the olefins contained in the gasoline. This saturation of olefins greatly affects the octane number (both the research and motor octane number) by lowering it. These olefins are saturated due to, in part, the hydrodesulfmrization conditions required to remove thiophenic compounds (such as, for example, thiophene, benzothiophene, alkyl thiophenes, alkylbenzothiphenes and alkyl dibenzothiophenes), which are some of the most difficult sulfur-containing compounds to removed. Additionally, the hydrodesulfurization conditions required to remove thiophenic compounds can also saturate aromatics.

In addition to the need for removal of sulfur from cracked-gasolines, there is also presented to the petroleum industry a need to reduce the sulfur content of diesel fuels. In removing sulfur from diesel by hydrodesuifirization, the cetane is improved but there is a large cost in hydrogen consumption. This hydrogen is consumed by both hydrodesulfurization and aromatic hydrogenation reactions.

Thus there is a need for a process wherein desulfurization without hydrogenation of aromatics is achieved so as to provide a more economical process for the treatment of diesel fuels.

As a result of the lack of success in providing successful and economically feasible process for the reduction of sulfur levels in both cracked-gasolines and diesel fuels, it is apparent that there is still needed a better process for the desulfurization of both cracked-gasolines and diesel fuels which has minimal affect of octane while achieving high levels of sulfur removal.

While it has been shown in my copending application Desulfurization and Novel Sorbents for Same, Ser. No.382, 935 filed Aug. 25, 1999, that one suitable sorbent system for the desulfurization of cracked-gasolines or diesel fuels is that employing a cobalt metal on a zinc oxide, silica, alumina support, there is a continuous effort to develop additional systems which permits the effecting of the desired desulfurization of such cracked-gasolines or diesel fuels and which also provide for alternative desulfurization conditions to permit variations within the operation parameters.

It is thus an object of the present invention to provide a novel sorbent system for the removal of sulfur from fluid streams of cracked-gasolines and diesel fuels.

Another object of this invention is to provide a process for the production of novel sorbents which are useful in the desulfurization of such fluid streams.

Another object of this invention is to provide a process for the removal of sulfur-containing compounds from cracked-gasolines and diesel fuels which minimize saturation of olefins and aromatics therein.

A still further object of this invention is to provide a desulfurized cracked-gasoline that contains less than about 100 parts per million of sulfur based on the weight of the desulfurized cracked-gasoline and which contains essentially the same amount of olefins and aromatics as were in the cracked-gasoline from which it is made.

Other aspects, objects and the several advantages of this invention will be apparent from the following description of the invention and the appended claims.

SUMMARY OF THE INVENTION

The present invention is based upon my discovery that through the utilization of a promotor derived from a metal, metal oxide or metal oxide precursor wherein the metal is selected from the group consisting of cobalt, nickel, iron, manganese, copper, molybdenum, tungsten, silver, tin and vanadium and mixtures thereof and wherein such metal is in a substantially reduced valence state, two or less, and wherein such metal is on a support comprising zinc oxide, silica, alumina and a calcium compound selected from the group consisting of calcium sulfate, calcium aluminate, calcium phosphate and calcium silicate there is achieved a novel sorbent composition which permits the ready removal of sulfur from streams of cracked-gasoline or diesel fuels with a minimal effect on the octane rating of the treated stream.

Such a sorbent system is further based upon my discovery that the use of a calcium compound selected from the group consisting of calcium sulfate, calcium aluminate and calcium silicate provides better porosity to the promotor support and serves to improve the attrition resistance of the support composition.

In addition, I have further discovered that through the replacement of a portion of the silica content of a support composition comprising zinc oxide, silica and alumina with a calcium compounds selected from the group consisting of calcium sulfate, calcium aluminate, calcium phosphate and calcium silica there is obtained a sorbent system having extended life through a reduction in the deactivation rate of the sorbent composition.

Accordingly, in one aspect of the present invention there is provided a novel sorbent suitable for the desulftirization of cracked-gasolines or diesel fuels which is comprised of zinc oxide, silica, alumina and a calcium compound selected from the group consisting of calcium sulfate, calcium aluminate, calcium phosphate and calcium silicate and a promotor metal, metal oxide or metal oxide precursor wherein the metal is selected from the group consisting of cobalt, nickel, iron, manganese, copper, molybdenum, tungsten, silver, tin and vanadium or mixtures thereof wherein the valence of the promotor metal is substantially reduced and wherein such reduced valence promotor is present in an amount to permit the removal of sulfur from cracked-gasolines or diesel fuels.

In accordance with another aspect of the present invention, there is provided a process for the preparation of a novel sorbent composition which comprises admixing zinc, oxide, silica, alumina and a calcium compound selected from the group consisting of calcium sulfate, calcium aluminate, calcium phosphate and calcium silicate so as to form a wet mix, dough, paste or slurry thereof, particulating the wet mix, dough, paste or slurry thereof so as to form as particulate granule, extrudate, tablet, sphere, pellet or microsphere thereof, drying the resulting particulate; calcining the dried particulate; impregnating the resulting solid particulate with a metal, metal oxide or metal oxide precursor wherein the metal is selected from the group consisting of cobalt, nickel, iron, manganese, copper, molybdenum, tungsten, silver, tin and vanadium or mixtures thereof; drying the resulting impregnated solid particulate composition; calcining the dried particulate composition; and reducing the calcined product with a suitable reducing agent, such as hydrogen, so as to produce a sorbent composition having a reduced promotor metal content in an amount which is sufficient to permit the removal with same of sulfur from a cracked-gasoline or diesel fuel stream.

In accordance with a further aspect of the present invention there is provided a process for the desulfurization of a cracked-gasoline or diesel fuel stream which comprises desulfurizing in a desulfurization zone cracked-gasoline or diesel fuel with a sorbent composition comprising a promotor metal on a support composition comprised of zinc oxide, silica, alumina and a calcium compound selected from the group consisting of calcium sulfate, calcium aluminate, calcium phosphate and calcium silicate wherein said promotor metal is present in a substantially reduced valence and in an amount which effects the removal of sulfur from a stream of cracked-gasoline or diesel fuel when contacted with same under desulfurization conditions; separating the desulfurized cracked-gasoline or diesel fuel from the sulfurized sorbent, regenerating at least a portion of the sulfurized sorbent to produce a regenerated desulfurized solid sorbent; activating at least a portion of the regenerated desulfurized sorbent to produce a solid sorbent having a reduced metal content; and thereafter returning at least a portion of the resulting reduced promotor metal containing sorbent to the desulfurization zone.

The novel sorbents of the present invention are useful for the removal of thiophenic sulfur compounds from fluid streams of cracked-gasoline or diesel fuel without having a significant adverse affect on the olefin content of such streams, thus avoiding a significant reduction of octane values of the treated stream. Moreover, the use of such novel sorbents results in a significant reduction of the sulfur content of the resulting treated fluid stream.

DETAILED DESCRIPTION OF THE INVENTION

The term "gasoline" as employed herein is intended to mean a mixture of hydrocarbons boiling from about 100° F. to approximately 400° F. or any fraction thereof. Such hydrocarbons will include, for example, hydrocarbon streams in refineries such as naphtha, straight-run naphtha, coker naphtha, catalytic gasoline, visbreaker naphtha, alkylate, isomerate or reformate.

The term "cracked-gasoline" as employed herein is intended to mean hydrocarbons boiling from about 100° F. to approximately 400° F. or any fraction thereof that are products from either thermal or catalytic processes that crack larger hydrocarbon molecules into smaller molecules. Examples of thermal processes include coking, thermal cracking and visbreaking. Fluid catalytic cracking and heavy oil cracking are examples of catalytic cracking. In some instances the cracked-gasoline may be fractionated and/or hydrotreated prior to desulfurization when used as a feed in the practice of this invention.

The term "diesel fuel" as employed herein is intended to mean a fluid composed of a mixture of hydrocarbons boiling from about 300° F. to approximately 750° F. or any fraction thereof. Such hydrocarbon streams include light cycle oil, kerosene, jet fuel, straight-run diesel and hydrotreated diesel.

The term "sulfur" as employed herein is intended to mean those organosulfur compounds such as mercaptans or those thiophenic compounds normally present in cracked gasolines which include among others thiophene, benzothiophene, alkyl thiophenes, alkyl benzothiophenes and alkyldibenzothiophenes as well as the heavier molecular weights of same which are normally present in a diesel fuel of the types contemplated for processing in accordance with the present invention.

The term "gaseous" as employed herein is intended to mean that state in which the feed cracked-gasoline or diesel fuel is primarily in a vapor phase.

The term "substantially reduced valence" as employed herein is intended to mean that a large portion of the valence of the promotor metal component of the sorbent composition is reduced to a lower valence state, preferably zero.

The term "promotor" or "promotor metal" as employed herein is intended to mean a metal, metal oxide or metal oxide precursor wherein the metal is selected from the group consisting of cobalt, nickel, iron, manganese, copper, molybdenum, tungsten, silver, tin and vanadium, or mixtures thereof.

The present invention is based upon applicant's discovery that through the use of a promotor or promotor metal as above defined wherein the valence of such promotor has been substantially reduced and wherein such reduce valence promotor is on a support comprising zinc oxide, silica, alumina and a calcium compound selected from the group consisting of calcium sulfate, calcium aluminate, calcium phosphate and calcium silicate there is achieved a novel sorbent composition which permits the ready removal of sulfur from streams of cracked-gasoline or diesel fuels with a minimal effect on the octane rating of the treated stream.

In a presently preferred embodiment of this invention, the sorbent composition has a promotor content in the range of from about 5 to about 50 weight percent weight of sorbent composition.

The zinc oxide used in the preparation of the sorbent composition can either be in the form of zinc oxide, or in the form of one or more zinc compounds that are convertible to zinc oxide under the conditions of preparation described herein. Examples of such zinc compounds include, but are not limited to, zinc sulfide, zinc sulfate, zinc hydroxide, zinc carbonate, zinc acetate, and zinc nitrate. Preferably, the zinc oxide is in the form of powdered zinc oxide.

The silica used in the preparation of the sorbent compositions may be either in the form of silica or in the form of one or more silicon-containing compounds. Any suitable type of silica may be employed in the sorbent compositions of the present invention. Examples of suitable types of silica include diatomite, silicalite, silica colloid, flame-hydrolyzed silica, hydrolyzed silica, silica gel and precipitated silica, with diatomite being presently preferred. In addition, silicon compounds that are convertible to silica such as silicic acid, sodium silicate and ammonium silicate can also be employed. Preferably, the silica is in the form of diatomite.

The starting alumina component of the composition can be any suitable commercially available alumina material including colloidal alumina solutions and, generally, those alumina compounds produced by the dehydration of alumina hydrates.

The calcium component of the sorbent composition is one selected from the group consisting of calcium sulfate, calcium silicate, calcium phosphate and calcium aluminate.

In achieving the advantages of the sorbent system of the present invention, the sorbent support should contain a calcium compound in an amount in the range of about 5 to about 90 weight percent of the amount of silica present in the sorbent composition. In one presently preferred embodiment of the invention the calcium compound is present in an amount such that the ratio of calcium to silica is in the range of about 0.1 to about 0.9.

In formulating the novel sorbent system of the present invention, the zinc oxide will generally be present in the sorbent composition in an amount in the range of about 10 weight percent to about 90 weight percent and preferably in an amount in the range of from about 15 to about 60 weight percent when such weight percents are expressed in terms of the zinc oxide based upon the total weight of the sorbent composition.

The silica will generally be present in the sorbent composition in an amount in the range of from about 5 weight percent to about 85 weight percent, preferably in an amount in the range of from about 20 weight percent to about 60 weight percent when the weight percents are expressed in terms of the silica based upon the total weight of the sorbent composition.

The alumina will generally be present in the sorbent composition in an amount in the range of from about 5 weight percent to about 30 weight percent, preferably from about 5 weight percent to about 15 weight percent when such weight percents are expressed in terms of the weight of the alumina compared with the total weight of the sorbent system.

In the manufacture of the sorbent composition, the primary components of zinc oxide, silica, alumina and calcium are combined together in appropriate proportions by any suitable manner which provides for the intimate mixing of the components to provide a substantially homogeneous mixture.

Any suitable means for mixing the sorbent components can be used to achieve the desired dispersion of the materials. Such means include, among others, tumblers, stationary shells or troughs, Muller mixers, which are of the batch or continuous type, impact mixers and the like. It is presently preferred to use a Muller mixer in the mixing of the silica, alumina, zinc oxide and calcium components.

Once the sorbent components are properly mixed to provide a shapeable mixture, the resulting mixture can be in the form of wet mix, dough, paste or slurry. If the resulting mix is in the form of a wet mix, the wet mix can be densified and thereafter particulated through the granulation of the densified mix following the drying and calcination of same. When the admixture of zinc oxide, silica, alumina and calcium results in a form of the mixture which is either in a dough state or paste state, the mix can be shaped to form a particulate granule, extrudate, tablet, sphere, pellet or microsphere. Presently preferred are cylindrical extrudates having from $\frac{1}{32}$ inch to $\frac{1}{2}$ inch diameter and any suitable length. The resulting particulate is then dried and then calcined. When the mix is in the form of a slurry, the particulation of same is achieved by spray drying the slurry to form microspheres thereof having a size of from about 20 to about 500 microns. Such microspheres are then subjected to drying and calcination. Following the drying and calcination of the particulated mixture, the resulting particulates can be impregnated with a promotor derived from a metal, metal oxide or metal oxide precursor wherein the metal is selected from the group consisting of cobalt, nickel, iron, manganese, copper, molybdenum, tungsten, silver, tin and vanadium or mixtures thereof.

Following the impregnation of the particulate compositions with the appropriate promotor metal compound, the resulting impregnated particulate is then subjected to drying and calcination prior to the subjecting of the calcined particulate to reduction with a reducing agent, preferably hydrogen.

The promotor metal can be added to the particulated support material by impregnation of the mixture with a solution, either aqueous or organic, that contains the selected promotor compound. In general, the impregnation with the promotor is carried out so as to form a resulting particulate composition of support and promotor prior to the drying and calcination of the resulting impregnated sorbent composition.

The impregnation solution is any aqueous solution or organic solution and amounts of such solution which suitably provides for the impregnation of the support mixture to give an amount of promotor metal in the final support-promotor composition to provide when reduced, a reduced valence promotor metal content sufficient to permit the removal of sulfur from streams of cracked-gasoline or diesel fuels when so treated with same in accordance with the process of the present invention.

Once the promotor has been incorporated into the particulated support mixture, the desired reduced valence promotor metal containing sorbent is prepared by drying the resulting composition followed by calcination and thereafter subjecting the resulting calcined composition to reduction with a suitable reducing agent, preferably hydrogen, so as to produce a sorbent composition having a substantial reduced valence promotor metal, preferably having a zero valence content, with such reduced metal content being present in an amount to permit the removal with same of sulfur from a cracked-gasoline or diesel fuel fluid stream.

The solid reduced metal sorbent of this invention are compositions that has the ability to react with and/or chemisorb with organosulfur compounds, such as thiophenic compounds. In addition such sorbents serve to remove diolefins and other gum forming compounds from the cracked-gasoline.

The solid reduced metal sorbent of this invention is comprised of a promotor or promotor metal that is in a substantially reduced valence state, preferably two or less. The amount of reduced promotor metal in the novel sorbents of this invention is that amount which will permit the removal of sulfur from a cracked-gasoline or diesel fuel fluid stream. Such amounts are generally in the range of from about 5 to about 50 weight percent of the total weight of the promotor metal in the sorbent composition. Presently, it is preferred that the reduced valence promotor metal be present in an amount in the range of from about 15 to about 40 weight percent of the total weight of promotor metal in the sorbent composition.

In one presently preferred embodiment of the present invention, zinc oxide is present in an amount of about 39 weight percent, silica is present in an amount of about 23 weight percent, alumina is present in an amount of about 8 weight percent, the calcium component is calcium sulfate and is present in an amount of about 8 weight percent and the promotor is nickel and is present in an amount of about 23 weight percent prior to reduction substantially to zero valence.

From the above, it can be appreciated that the sorbent compositions which are useful in the desulfurization process of this invention can be prepared by a process which comprises:

(a) admixing zinc oxide, silica, alumina and calcium component so as to form a mix of same in the form of one of a wet mix, dough, paste or slurry;

(b) particulating the resulting mix to form particulates thereof in the form of one of granules, extrudates, tablets, pellets, spheres or microspheres;

(c) drying the resulting particulate;

(d) calcining the dried particulate;

(e) impregnating the resulting calcined particulate with a metal, metal oxide or metal oxide precursor promotor having as a metal component therein at least one metal selected from the group consisting cobalt, nickel, iron, manganese, copper, molybdenum, tungsten, silver, tin and vanadium;

(f) drying the impregnated particulate;

(g) calcining the resulting dried particulate; and (h) reducing the calcined particulate product of (g) with a suitable reducing agent so as to produce a particulate composition having a substantial reduced valence promotor metal content therein and wherein the reduced valence promotor metal content is present in an amount sufficient to permit the removal with same of sulfur from a cracked-gasoline or diesel fuel fluid stream when contacted with the resulting substantially reduced valence promotor particulated sorbent.

The process to use the novel sorbents to desulfurize cracked-gasoline or diesel fuels to provide a desulftirized cracked-gasoline or diesel fuel comprises:

(a) desulfurizing in a desulfurization zone a cracked-gasoline or diesel fuel with a solid reduced promotor metal containing sorbent;

(b) separating the desulfurized cracked-gasoline or desulfurized diesel fuel from the resulting sulfurized solid reduced promotor metal containing sorbent;

(c) regenerating at least a portion of the sulfurized solid reduced metal containing sorbent to produce a regenerated desulfurized solid metal containing sorbent;

(d) reducing at least a portion of the regenerated desulfurized solid metal containing sorbent to produce a solid reduced metal containing sorbent, and thereafter;

(e) returning at least a portion of the regenerated solid reduced metal containing sorbent to the desulfurization zone.

The desulfurization step (a) of the present invention is carried out under a set of conditions that includes total pressure, temperature, weight hourly space velocity and hydrogen flow. These conditions are such that the solid reduced promotor containing sorbent can desulfurize the cracked-gasoline or diesel fuel to produce a desulfurized cracked-gasoline or desulfurized diesel fuel and a sulfurized sorbent.

In carrying out the desulfurization step of the process of the present invention, it is preferred that the feed cracked-gasoline or diesel fuel be in a vapor phase. However, in the practice of the invention it is not essential, albeit preferred, that the feed be totally in a vapor or gaseous state.

The total pressure can be in the range of about 15 psia to about 1500 psia. However, it is presently preferred that the total pressure be in a range of from about 50 psia to about 500 psia.

In general, the temperature should be sufficient to keep the cracked-gasoline or diesel fuel essentially in a vapor phase. While such temperatures can be in the range of from about 100° F. to about 1000° F., it is presently preferred that the temperature be in the range of from about 400° F. to about 800° F. when treating as cracked-gasoline and in the range of from about 500° F. to about 900° F. when the feed is a diesel fuel.

Weight hourly space velocity (WHSV) is defined as the pounds of hydrocarbon feed per pound of sorbent in the desulfurization zone per hour. In the practice of the present invention, such WHSV should be in the range of from about 0.5 to about 50, preferably about 1 to about 20 $hr^{-1}$.

In carrying out the desulfurization step, it is presently preferred that an agent be employed which interferes with any possible chemisorbing or reacting of the olefinic and aromatic compounds in the fluids which are being treated with the solid reduced promotor metal containing sorbent. Such an agent is presently preferred to be hydrogen.

Hydrogen flow in the desulfurization zone is generally such that the mole ratio of hydrogen to hydrocarbon feed is the range of about 0.1 to about 10, and preferably in the range of about 0.2 to about 3.0.

The desulfurization zone can be any zone wherein desulfurization of the feed cracked-gasoline or diesel fuel can take place. Examples of suitable zones are fixed bed reactors, moving bed reactors, fluidized bed reactors and transport reactors. Presently, a fluidized bed reactor or a fixed bed reactor is preferred.

If desired, during the desulfurization of the vaporized fluids, diluents such as methane, carbon dioxide, flue gas, and nitrogen can be used. Thus it is not essential to the practice of the process of the present invention that a high purity hydrogen be employed in achieving the desired desulfurization of the cracked-gasoline or diesel fuel.

It is presently preferred when utilizing a fluidized system that a solid reduced promotor metal sorbent be used that has a particle size in the range of about 20 to about 1000 micrometers. Preferably, such sorbents should have a particle size of from about 40 to about 500 micrometers. When a fixed bed system is employed for the practice of the desulfurization process of this invention, the sorbent should be such as to have a particle size in the range of about 1/32 inch to about 1/2 inch diameter.

It is further presently preferred to use solid reduced promotor metal sorbents that have a surface area of from about 1 square meter per gram to about 1000 square meters per gram of solid sorbent.

The separation of the gaseous or vaporized desulfurized fluids and sulfurized sorbent can be accomplished by any means known in the art that can separate a solid from a gas. Examples of such means are cyclonic devices, settling chambers or other impingement devices for separating solids and gases. The desulfurized gaseous cracked-gasoline or desulfurized diesel fuel can then be recovered and preferably liquefied.

The gaseous cracked-gasoline or gaseous diesel fuel is a composition that contains in part, olefins, aromatics and sulfur-containing compounds as well as paraffins and naphthenes.

The amount of olefins in gaseous cracked-gasoline is generally in the range of from about 10 to 35 weight percent based on the weight of the gaseous cracked-gasoline. For diesel fuiel there is essentially no olefin content.

The amount of aromatics in gaseous cracked-gasoline is generally in the range of about 20 to about 40 weight percent based on the weight of the gaseous cracked gasoline. The amount of aromatics in gaseous diesel fuel is generally in the range of about 10 to about 90 weight percent.

The amount of sulfuir in cracked-gasolines or diesel fuels can range from about 100 parts per million sulfur by weight of the gaseous cracked-gasoline to about 10,000 parts per million sulfuir by weight of the gaseous cracked-gasoline and from about 100 parts per million to about 50,000 parts per million for diesel fuel prior to the treatment of such fluids with the sorbent system of the present invention.

The amount of sulfur in cracked-gasolines or in diesel fuels following treatment of same in accordance with the desulfurization process of this invention is less than 100 parts per million.

In carrying out the process of this invention, if desired, a stripper unit can be inserted before the regenerator for regeneration of the sulfuirized sorbent which will serve to remove a portion, preferably all, of any hydrocarbons from the sulfuirized sorbent or before the hydrogen reduction zone so as to remove oxygen and sulfur dioxide from the system prior to introduction of the regenerated sorbent into the sorbent activation zone. The stripping comprises a set of conditions that includes total pressure, temperature and stripping agent partial pressure.

Preferably the total pressure in a stripper, when employed, is in a range of from about 25 psia to about 500 psia.

The temperature for such strippers can be in the range of from about 100° F. to about 1000° F.

The stripping agent is a composition that helps to remove hydrocarbons from the sulfurized solid sorbent. Presently, the preferred stripping agent is nitrogen.

The sorbent regeneration zone employs a set of conditions such that at least a portion of the sulfurized sorbent is desulfurized.

The total pressure in the regeneration zone is generally in the range of from about 10 to about 1500 psia. Presently preferred is a total pressure in the range of from about 25 psia to about 500 psia.

The sulfur removing agent partial pressure is generally in the range of from about 1 percent to about 25 percent of the total pressure.

The sulfur removing agent is a composition that helps to generate gaseous sulfur oxygen-containing compounds such as sulfur dioxide, as well as to burn off any remaining hydrocarbon deposits that might be present. Currently, oxygen-containing gases such as air are the preferred sulfur removing agents.

The temperature in the regeneration zone is generally from about 100° F. to about 1500° F. with a temperature in the range of about 800° F. to about 1200° F. being presently preferred.

The regeneration zone can be any vessel wherein the desulfurizing or regeneration of the sulfurized sorbent can take place.

The desulfurized sorbent is then reduced in an activation zone with a reducing agent so that at least a portion of the promotor metal content of the sorbent composition is reduced to produce a solid reduced metal sorbent having an amount of reduced metal therein to permit the removal of sulfur components from a stream of cracked-gasoline or diesel fuel.

In general, when practicing the process of this invention, the reduction of the desulfurized solid promotor containing sorbent is carried out at a temperature in the range of about 100° F. to about 1500° F. and a pressure in the range of about 15 to 1500 psia. Such reduction is carried out for a time sufficient to achieve the desired level of promotor reduction in the sorbent system. Such reduction can generally be achieved in a period of from about 0.01 to about 20 hours.

Following the activation of the regenerated particulate sorbent, at least a portion of the resulting activated (reduced) sorbent can be returned to the desulfurization unit.

When carrying out the process of the present invention in a fixed bed system, the steps of desulfurization, regeneration, stripping, and activation are accomplished in a single zone or vessel.

The desulfurized cracked-gasoline resulting from the practice of the present invention can be used in the formulation of gasoline blends to provide gasoline products suitable for commercial consumption.

The desulfurized diesel fuels resulting from the practice of the present invention can likewise be used for commercial consumption where a low sulfur-containing fuel is desired.

EXAMPLES

The following examples are intended to be illustrative of the present invention and to teach one of ordinary skill in the art to make and use the invention. These examples are not intended to limit the invention in any way.

Example I

A solid reduced nickel metal sorbent was produced by dry mixing 568 grams of diatomite silica and 945 grams of zinc oxide and 189 grams CaSO$_4$ in a mix-Muller for 10 minutes to produce a first mixture. While still mixing, a solution containing 241 grams of Disperal alumina (Condea), 850 grams of deionized water and 26 grams of glacial acetic acid, were added to the mix-Muller to produce a second mixture. After adding these components, mixing continued for an additional 25 minutes. This second mixture was then dried at 300° F. for 3 hours and then calcined at 1175° F. for 1 hour to form a third mixture. This third mixture was then particulated by granulation using a Stokes Pennwalt Granulator fitted with a 50 mesh screen. Fifty grams of resulting granulated mixture was impregnated with 37.1 grams of nickel nitrate hexahydrate dissolved in 11.7 grams of hot deionized water to produce a first impregnated particulate. The first impregnated particulate was dried at 300° F. for one hour and then calcined at 1175° F. for one hour to form a solid particulate nickel oxide-containing composition. The resulting calcined particulate was impregnated with 37.1 g Ni (NO$_3$)$_2$. 6H$_2$O dissolved in 9.0 g deionized water. The second impregnated particulate was again dried at 300° F. for one hour and then calcined at 1175° F. for one hour.

Reduction of the particulate solid calcined composition comprising zinc oxide, silica, alumina, calcium sulfate and a nickel compound so as to obtain the desired sorbent having a reduced valence nickel content is carried out in the reactor as described in Example II. Alternatively, such reduction or activation of the particulate composition to form the desired sorbent can be carried out in a separate activation or hydrogenation zone and subsequently transferred to the unit in which desulfurization of the feedstock is to be carried out.

Example II

The particulate solid nickel sorbent as prepared in Example I was tested for its desulfurization ability as follows.

A 1-inch quartz reactor tube was loaded with the indicated amounts as noted below of the sorbent of Example I. This solid nickel sorbent was placed on a frit in the middle of the reactor and subjected to reduction with hydrogen at a total pressure of 15 psia and hydrogen partial pressure of 15 psi for 0.03 hr. Gaseous cracked-gasoline having about 340 parts per million sulfur by weight sulfuir-containing compounds based on the weight of the gaseous cracked-gasoline and having about 95 weight percent thiophenic compounds (such as for example, alkyl benzothiophenes, alkyl thiophenes, benzothiophene and thiophene) based on the weight of sulfur-containing compounds in the gaseous cracked-gasoline was then pumped upwardly through the reactor. The rate was 13.4 milliliters per hour. This produced sulfurized solid sorbent and desulfurized gaseous-cracked gasoline. In Run 1, hydrogen was added to the cracked-gasoline feed at a partial pressure of 13.2 psi which resulted in the reduction of sulfur content of gasoline from 340 ppm to less than or equal to 5 ppm.

After Run 1, the sulfurized sorbent was subjected to desulfurizing conditions that included a temperature of 900° F., a total pressure of 15 psia and an oxygen partial pressure of 0.6 psi for a time period of 3 hours. Such conditions are hereinafter referred to as "regeneration conditions" to produce a desulfurized nickel-containing sorbent. This sorbent was then subjected to reducing conditions that included a temperature of 700° F., a total pressure of 15 psia and a hydrogen partial pressure of 15 psi for a time period of 1.25 hours. Such conditions are hereinafter referred to as "reducing conditions".

The resulting solid reduced nickel metal sorbent composition was then used in Run 2. In this run, hydrogen was added to the cracked-gasoline feed at a partial pressure of 13.2 psi which resulted in the reduction of sulfur content to less than 5 ppm indicating the sorbent is fully regenerated and no loss in sulfur removal activity is observed after regeneration.

A composite of product gasoline from Run 1 was subjected to a test to determine its Research Octane Number (RON) and Motor Octane Number (MON). The RON and MON for the product from Run 1 were 90.6 and 80.3 as compared to the RON of 91.1 and MON of 80.0 for the cracked-gasoline feed, indicating that the octane of the cracked-gasoline was substantially unaffected by carrying out the inventive desulfurization process.

The results of this series of runs are set forth in Table 1:

TABLE 1

| Reactor Conditions | Run Number | |
|---|---|---|
| | 1 | 2 |
| Amount (grams) | 10 | 10 |
| TP[1] | 15 | 15 |
| HPP[2] | 13.2 | 13.2 |
| ° F. | 700 | 700 |
| TOS[3] | | Sulfur[4] |
| 1 | 5 | 5 |
| 2 | <5 | <5 |
| 3 | 5 | |
| 4 | 5 | |
| 5 | 5 | |
| 6 | 5 | |

[1]Total pressure in psia.
[2]Hydrogen partial pressure in psi.
[3]The time on stream in hours.
[4]The amount of sulfur-containing compounds left in the desulfurized cracked-gasoline in parts per million sulfur by weight based on the weight of the desulfurized cracked-gasoline.

The specific examples herein disclosed are to be considered as being primarily illustrative. Various changes beyond those described will no doubt occur to those skilled in the art; and such changes are to be understood as forming a part of this invention insofar as they fall within the spirit and scope of the appended claims.

That which is claimed is:

1. A process for the production of a sorbent composition suitable for the removal of sulfur from a cracked-gasoline or diesel fuel stream which comprises:

(a) admixing of zinc oxide, silica and alumina and a calcium compound selected from the group consisting of calcium sulfate, calcium aluminate, calcium phosphate and calcium silicate;

(b) particulating the resulting mix so as to form particles thereof;

(c) drying the particulate of step (b);

(d) calcining the dried particulate of step (c);

(e) impregnating the resulting calcined particulate of step (d) with a metal, metal oxide or metal oxide precursor promotor wherein the metal is selected from the group consisting of cobalt, nickel, iron, manganese, copper, molybdenum, tungsten, silver, tin and vanadium or mixtures thereof;

(f) drying the impregnated particulate of step (e);

(g) calcining the dried particulate of step (f); and thereafter (h) reducing the resulting calcined particulate of step (g) with a suitable reducing agent under suitable conditions to produce a particulate composition having a substantial reduced valence promotor metal content therein such that the reduced valence promotor metal containing composition will effect the removal of sulfur from a stream of cracked-gasoline or diesel fuel when said stream is contacted with said reduced valence promotor metal containing composition under desulfurization conditions.

2. A process in accordance with claim 1 wherein said mix is in the form of one of a wet mix, dough, paste or slurry.

3. A process in accordance with claim 1 wherein said particulate are in the form of one of granules, extrudates, tablets, spheres, pellets or mirospheres.

4. A process in accordance with claim 1 wherein said zinc oxide is present in an amount in the range of from about 10 to about 90 weight percent, said silica is present in an amount in the range of about 5 to about 85 weight percent, said alumina is present in an amount in the range of about 5 to about 30 weight percent and said calcium compound is present in an amount in the range of about 5 to about 90 weight percent of the amount of silica present in the sorbent composition.

5. A process in accordance with claim 4 wherein said calcium compound is present in an amount such that the ratio of said calcium compound to said silica is in the range of about 0.1 to about 0.9.

6. A process in accordance with claim 1 wherein said particulate is dried in steps (c) and (f) at a temperature in the range of about 150° F. to about 350° F.

7. A process in accordance with claim 1 wherein said dried particulate is calcined in steps (d) and (g) at a temperature in the range of about 400° F. to about 1500° F.

8. A process in accordance with claim 1 wherein said zinc oxide is present in an amount of about 39 weight percent, said silica is present in an amount of about 23 weight percent, said alumina is present in an amount of about 8 weight percent, said calcium compound is present in an amount of about 8 weight percent and the said promotor metal is present in an amount of about 23 weight percent prior to reduction substantially to zero valence.

9. A process in accordance with claim 8 wherein said calcium compound is calcium sulfate and said promotor metal is nickel.

10. A process in accordance with claim 1 wherein said reducing agent is hydrogen.

11. A process in accordance with claim 10 wherein the reduction of said calcined particulate is carried out at a temperature in the range of about 100° F. to about 1500° F. and at a pressure in the range of about 15 to about 1500 psia for a time sufficient to permit the formation of the reduced valence promotor metal containing composition.

* * * * *